Oct. 1, 1929.  E. T. BARRON  1,729,978

MOISTURE TRAP FOR AUTOMOBILE CRANK CASES

Filed June 25, 1928

INVENTOR
F. T. Barron
BY
ATTORNEY

Patented Oct. 1, 1929

1,729,978

UNITED STATES PATENT OFFICE

EDWARD T. BARRON, OF MINNEAPOLIS, MINNESOTA

MOISTURE TRAP FOR AUTOMOBILE CRANK CASES

Application filed June 25, 1928. Serial No. 288,239.

This invention relates to moisture traps for crank cases of internal combustion engines.

It is well known that in operating an automobile in a cold climate moisture condenses on the inside of the crank case forming water which settles at the lowest point in the crank case and accumulates there when the car is allowed to stand idle for any length of time and freezes. This freezing of the water forms a stoppage for the intake of the oil to the circulating pump and prevents the oil from flowing thereby causing much damage and injury to the engine.

A primary object of the invention is to overcome this difficulty by providing simple and efficient means to take care of the accumulation of water in the crank case and by means of which the trapped water will be protected against being disturbed and prevented from mixing with the oil in the crank case which is likely to occur by the agitation of the circulation pump, the splash of the engine, or the vibration of the car in driving.

Another object of the invention is to so construct such a device as to insure the intake of the circulating pump from ever being submerged in water and therefore preventing all possibility of stoppage of the pump by freezing.

Another object of the invention is to so construct a crank case trap that the water accumulating in the crank case may be permitted to drain in the trap normally and when it is desired to draw off the water from the trap it may be accomplished without affecting the contents of the crank case.

Still another object is to provide a drain cock for use in connection with a trap of this character which provides for the trapping of the accumulated water of condensation, the cutting off communication between the crank case and the trap, and simultaneously bringing the trap into communication with the exterior of the trap, and which may be so manipulated as to bring both the interior of the crank case and the trap into communication with the surrounding area to provide for the draining and washing out of crank case when necessary.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 of the accompanying drawings represents a side elevation of a portion of an automobile engine having a crank case equipped with this improved trap;

In the embodiment illustrated a crank case 1 is shown of ordinary construction the side walls being tapered downwardly toward the bottom 2 and the latter being provided at its lowest point, preferably at the center with an opening 3 of comparatively small size. This crank case 1 is flanged at its upper edge as is customary and is bolted to the engine in the usual manner.

Figure 1:
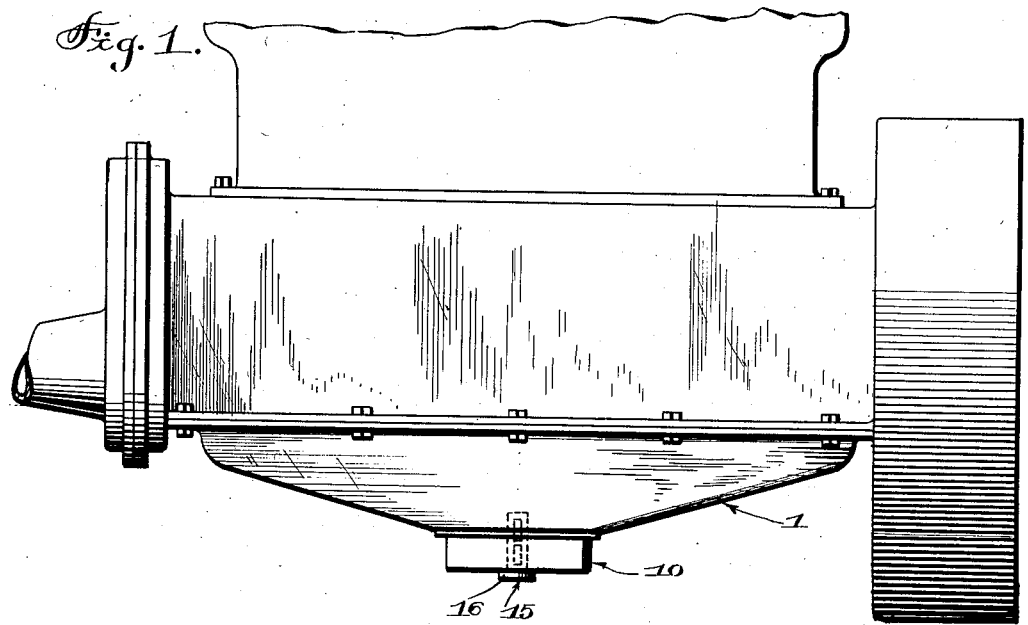
Figure 3:
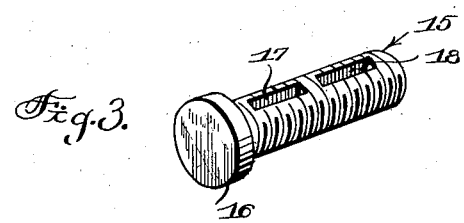
Fig. 3 is a perspective view of the drain cock used in connection with the trap.
Figure 2:
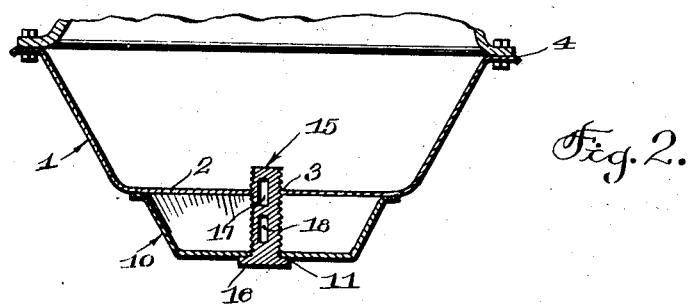
Fig. 2 is a detail transverse section through the crank case and trap.

Located on the outer face of the bottom 2 of the crank case is the trap 10 constituting the invention and which is here shown made in the form of a pan which may be secured to the crank case in any suitable manner, either made integral therewith or welded thereto or secured in liquid tight relation in any desired way. This trap 10 extends over a comparatively small area of the bottom 2 of the crank case and has formed therein an opening 11 which registers with the opening 3 in the crank case bottom and which is designed to receive a drain cock 15 here shown in the form of an exteriorly threaded plug having a flanged head 16 which is designed to abut the outer face of the trap bottom when the cock is pushed inward to its full extent. This plug 16 is of a length sufficient to screw in through the openings 3 and 11 of the crank case and trap, respectively, and when screwed into its full extent to project some distance into the crank case as is shown clearly in Fig. 2. Longitudinally spaced slots 17 and 18 extend transversely through the plug 16 and are designed to register with the interior of the crank case 1 and the trap 10 as shown in Fig. 2 when the plug or cock is screwed in to its full extent as shown in Fig. 2. These slots or openings 17 and 18 are so proportioned and arranged that when the plug is screwed out a sufficient distance communication between the crank case 1 and the trap 10 will be cut off and the trap brought into communication with the outside thereof for discharging the contents of the trap into any suitable container or onto the ground.

The use of this drain cock 15 provides for the easy draining of the trap without disturbing the fluid in the crank case by unscrewing the cock until the slot 18 is midway between the bottom of the trap which will leave the opening for the fluid in the trap to flow to the outside. When in this position the slot 17 will be wholly within the trap 10 and thereby entirely close the opening between the crank case and the trap.

When it becomes necessary to complete the drain and wash out the crank case this can be easily accomplished by unscrewing the drain cock 15 until the slot 17 is midway between the bottom of the crank case, this will bring the crank case into communication with the trap and at the same time will leave an opening from the trap to the outside through the slot 18. After draining and washing out the crank case the cock may be screwed back into its original position and to function as before.

In the use of this device the moisture which condenses on the side walls of the crank case will sink to the bottom of the case will flow along said bottom until it reaches the lowest point where the opening 3 is located and the water will flow out through the opening 17 in the drain cock into the trap 10. As the water accumulates in the trap 10 it rises in the trap carrying on the top thereof the oil out of the crank case and until this trap is completely filled with water there is always a layer of oil of varying thickness according to the amount of water in the trap. This layer of oil prevents the water from being disturbed or mixing with the oil in the crank case. This provision of water trap prevents all possibility of the intake of the circulating pump ever being submerged in water and thus avoiding the consequent stoppage by freezing.

While the drain cock 15 is shown located at the center of the crank case obviously it may be located at any desired point provided the point be the lowest point in the bottom of the crank case.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

1. In combination with a crank case having an opening in the bottom thereof, of a water trap arranged below said bottom around said opening, a drain cock threaded through said trap and through the opening in said bottom, said cock having openings for bringing the interior of the crank case into communication with the trap or for cutting it off.

2. In combination with a crank case having an opening in the bottom thereof, of a trap arranged below said bottom around said opening, a drain cock movable vertically through said trap and through the opening in said bottom, said cock having vertically spaced openings for bringing the interior of the crank case into communication with the trap or for cutting it off, said cock being adjustable to bring the trap into communication with the exterior thereof for draining the trap and at the same time cutting off communication between the trap and the crank case.

Signed at Minneapolis, in the county of Hennepin and State of Minnesota, this 21st day of June, A. D. 1928.

EDWARD T. BARRON.